Dec. 30, 1958     S. C. SAMUELS     2,866,689
PROCESS FOR PREPARING FEED STOCK FOR CARBON BLACK PRODUCTION
Filed Nov. 30, 1953
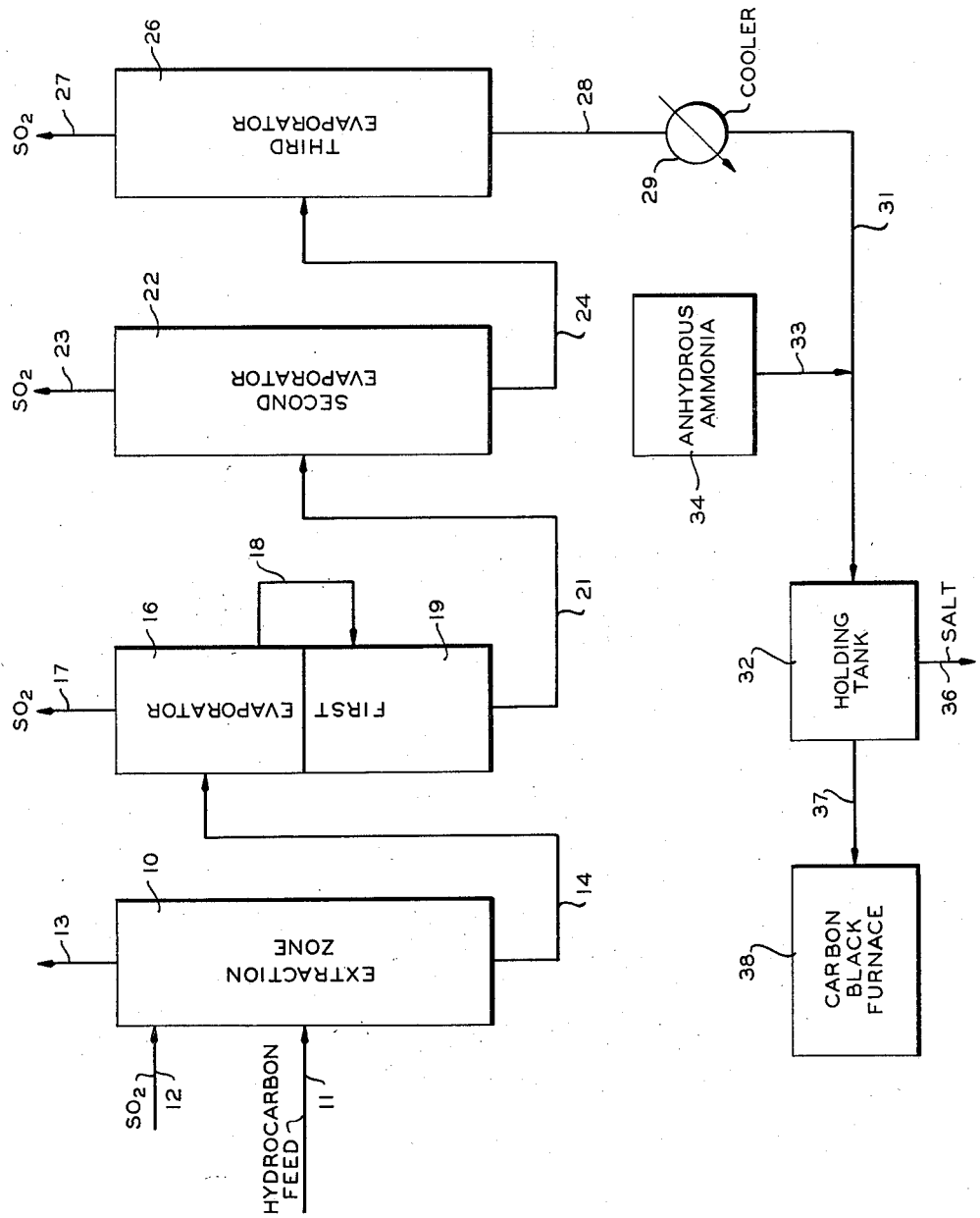
INVENTOR.
S.C. SAMUELS
BY *Hudson and Young*
ATTORNEYS

United States Patent Office 2,866,689
Patented Dec. 30, 1958

2,866,689

PROCESS FOR PREPARING FEED STOCK FOR CARBON BLACK PRODUCTION

Sherwood C. Samuels, Bartlesville, Okla., assignor to Phillips Petroleum Company, a corporation of Delaware Application November 30, 1953, Serial No. 395,275

12 Claims. (Cl. 23—209.1)

This invention relates to a process for the production of a feed stock to be used for the production of carbon black. A further aspect of this invention is to provide a stable extract produced by a sulfur dioxide extraction process. In a further aspect, this invention relates to a novel feed stock for the production of carbon black.

At the present time large amounts of carbon black are produced by burning hydrocarbon fractions in carbon black furnaces. The hydrocarbon feed stock can be prepared in various ways and one of the most common methods is to use a liquid sulfur dioxide extraction process. In such a process a petroleum fraction is separated by distillation into various fractions. A fraction boiling from 350 to 950, preferably 410 to 950 (ASTM distillation), is subject to solvent extraction with liquid sulfur dioxide to recover a fraction rich in unsaturated and aromatic components, since a feed containing such components is preferred for carbon black production.

One difficulty in operating such a process is the importance of accurate control of physical conditions during the steps in which the aromatic-sulfur dioxide fraction is separated into its components. In usual installations this separation is carried out in a 2, 3 or 4 stage evaporation process. Even using such multiple evaporation process, traces of sulfur dioxide are frequently found in the extract. The presence of sulfur dioxide is very detrimental when the extract is used for the production of carbon black. The sulfur dioxide leads to corrosion problems and extracts which are not treated according to the process of my invention frequently develop solid, gummy deposits.

Each of the following objects is obtained by at least one of the aspects of this invention.

An object of this invention is to prepare a carbon black feed stock.

A further object of this invention is to provide a process for the production of a carbon black feed stock, said feed stock having been treated with sulfur dioxide to obtain an aromatic fraction and then treated with ammonia.

A further object of this invention is to provide a method for the treatment of an $SO_2$ extract, said process making possible operation of the final stage of evaporation with less precise control.

Other objects and advantages will be apparent to one skilled in the art upon reading this specification.

The drawing is a diagrammatic flow sheet of the process of my invention.

I have discovered a process for the treatment of a feed stock for carbon black production which comprises extracting an unsaturated or aromatic fraction from a hydrocarbon feed stock by liquid sulfur dioxide extraction and treatment of the extract with anhydrous ammonia. The amount of ammonia added must be controlled within quite narrow limits in order that the extract will be most suitable for carbon black production. The extract is stabilized by the addition thereto of 0.025 to 0.15 pound of anhydrous ammonia per barrel of the treated hydrocarbon. Usually, a much narrower range of ammonia is used, this being from 0.068 to 0.075 pound per barrel, and in the preferred form of this invention, this latter range should be considered as the broad limit. When the final stage evaporator is properly operated, no more than 200 p. p. m. of sulfur dioxide should be present in the extract and sometimes as low as 50 p. p. m. are present. When the control on this final stage evaporator is poorly executed, the residual sulfur dioxide may run as high as 700 to 800 p. p. m. and, in such cases, the larger amounts of ammonia must be added.

Residual sulfur dioxide in the product stream makes future handling of the stream difficult because the hydrocarbon fraction is unstable. The development of gummy and resinous substances is accelerated and these substances cause frequent trouble in lines, valves, pumps, storage tanks and the like.

In the preferred form of this invention, a hydrocarbon fraction, which is the product of a catalytic cracking unit boiling in the range of 350 to 950° F. is contacted with sulfur dioxide at a pressure of 20 to 90 p. s. i. g. and a temperature of 20 to 90° F. As is well known, the overhead from such a treating unit comprises the paraffinic fraction of the feed and an extract fraction is obtained containing unsaturated compounds, including the aromatics, and sulfur dioxide. The preferred method for separating this extract phase comprises a 3-stage evaporation system including a first evaporator zone, this first zone comprising an upper portion operating at 115 to 130 p. s. i. g. and 130 to 150° F. and a lower portion operating at 90 to 110 p. s. i. g. and 290 to 310° F. The major portion of the sulfur dioxide is removed as an overhead stream from this first zone. The bottom fraction from the first evaporating zone is then introduced into a second evaporating zone operating at 3 to 5 p. s. i. g. and 300 to 320° F. An additional portion of sulfur dioxide is removed in this evaporating zone and the bottom fraction is introduced into a third or final evaporating zone operated at 50 to 75 mm. Hg and 340 to 360° F.

Operating under these conditions, the extract recovered from the third evaporating zone contains from 50 to 200 p. p. m. sulfur dioxide. This stream is cooled to a temperature as near 150° F. as possible and, at any rate, within the range of 140 to 160° F. After this cooling, anhydrous ammonia is injected into the cooled extract and the extract is then conveyed to a holding tank before being utilized in the carbon black. This holding tank is provided so that the ammonium sulfite produced in the process may be separated from the extract. The amount of ammonia added is preferably within the range of 0.068 to 0.075 pound per barrel. In a commercial installation, this amounts to approximately 15 pounds of ammonia per hour wherein 200 to 220 barrels per hour are being treated, these figures being based on the 42 gallon barrel used as standard by the petroleum industry.

It is important that the extract stream be cooled to approximately 150° F. before the introduction of the anhydrous ammonia, in order to obtain proper results when using such small amounts of the ammonia. The sulfur dioxide is evenly dissolved in the extract stream and, if the ammonia is injected while the extract is at too high a temperature, it is immediately expelled from the solution before the reaction has had time to be effected. I have found that temperatures above the preferred range are unsatisfactory for this contact. While lower temperatures could be used, they require increased cooling surfaces with the attendant increased cost and the benefits to be obtained by this further cooling are not compensated by improved results.

In the drawing, hydrocarbon feed line 11 and sulfur dioxide feed line 12 communicate with extraction zone 10. Conduit 13 is the raffinate removal conduit and conduit 14 is provided communicating with the upper portion 16 of the first evaporator. A sulfur dioxide removal conduit 17 is provided extending from the upper portion of this first evaporator. Conduit 18 extends from the lower portion of zone 16 to the upper portion of zone 19, the lower portion of the first evaporator. Conduit 21 is provided to convey the material from the lower portion of zone 19 to the second evaporator 22. A sulfur dioxide removal conduit 23 extends from the upper portion of evaporator 22 and conduit 24 extends from the lower portion thereof to the third evaporator 26. Evaporator 26 is also provided with a sulfur dioxide removal conduit 27. Conduit 28 extends from the lower portion of evaporator 26 to a cooler 29 and conduit 31 extends from the downstream end of cooler 29 to holding tank 32. Conduit 33 extends from an anhydrous ammonia source 34 to conduit 31. Holding tank 32 is provided with salt removal conduit 36 and hydrocarbon removal conduit 37, conduit 37 communicating with a carbon black furnace 38.

An important advantage of this invention is that there is no necessity for distillation of the extract following the treatment thereof with the anhydrous ammonia.

To show the detrimental effects that residual $SO_2$ can cause, the following comparison is presented. A portion of extract oil from a sulfur dioxide extraction unit was treated with 0.12 pound per barrel of anhydrous ammonia in an open vessel. This treatment was carried out by bubbling the ammonia through the oil. An excess was used over that which is normally required in the actual operation set forth above, this excess allowing for some loss since an open container was used. After this treatment, this oil was stored for one month in the absence of air. Following this time it was inspected and found to be free of solid material. In comparison, a further portion of the same extract oil was found to contain between 5 and 10 pounds of a solid material per thousand barrels of oil after only two weeks of storage under similar conditions. The quantity of solid material was determined by filtering the oil through a fritted glass filter crucible, washing the filtered solids with pentane, and drying the washed solids at a temperature of about 220° F.

Control of the process of my invention is relatively simple. The residual sulfur dioxide present in a treated hydrocarbon stream can be determined by washing a portion of the treated hydrocarbon with water and titrating the washed water to determine the acid content thereof.

As many possible embodiments may be made of this invention without departing from the scope thereof, it is to be understood that all matter herein set forth is to be interpreted as illustrative and not as unduly limiting the invention.

I claim:

1. A process of preparing an aromatic feed stock for the production of carbon black, comprising extracting a hydrocarbon feed having a boiling range of 350 to 950° F. with a selective solvent consisting of $SO_2$; recovering an extract from said extraction step; cooling said extract to a temperature of about 150° F.; and treating said cooled extract with 0.068 to 0.075 pound of anhydrous ammonia per barrel of said extract.

2. A process of preparing an aromatic feed stock for the production of carbon black, comprising extracting a hydrocarbon feed having a boiling range of 350 to 950° F. with a selective solvent consisting of $SO_2$; recovering an extract from said extraction step; cooling said extract to a temperature of 140 to 160° F.; and treating said cooled extract with 0.025 to 0.15 pound of anhydrous ammonia per barrel of said extract.

3. A process for preparing an aromatic feed stock for the production of carbon black, comprising contacting a hydrocarbon fraction boiling between 350 and 950° F. with $SO_2$ at a pressure of 20 to 90 p. s. i. g. and a temperature of 20 to 90° F., removing an aromatic-$SO_2$ fraction into a first evaporating zone comprising an upper portion operating at 115 to 130 p. s. i. g. and 130 to 150° F. and a lower portion operating at 90 to 110 p. s. i. g. and 290 to 310° F., recovering $SO_2$ as an overhead from said first evaporating zone; introducing the bottom fraction from said first evaporating zone to a second evaporating zone operated at 3 to 5 p. s. i. g. and 300 to 320° F., recovering $SO_2$ as an overhead from said second evaporating zone; introducing the bottom fraction from said second evaporating zone to a third evaporating zone operated at 50 to 75 mm. Hg and 340 to 360° F.; recovering $SO_2$ as an overhead from said third evaporating zone; recovering an aromatic fraction from the lower portion of said third evaporating zone, said fraction containing not over 200 p. p. m. of $SO_2$; cooling said aromatic fraction to a temperature of about 150° F.; and treating said cooled stream with 0.068 to 0.075 pound of anhydrous ammonia per barrel of said extract.

4. A process for preparing an aromatic feed stock for the production of carbon black, comprising contacting a hydrocarbon fraction boiling between 350 and 950° F. with $SO_2$ at a pressure of 20 to 90 p. s. i. g. and a temperature of 20 to 90° F., removing an aromatic-$SO_2$ fraction; introducing said aromatic-$SO_2$ fraction into a first evaporating zone comprising an upper portion operating at 115 to 130 p. s. i. g. and 130 to 150° F. and a lower portion operating at 90 to 110 p. s. i. g. and 290 to 310° F.; recovering $SO_2$ as an overhead from said first evaporating zone; introducing the bottom fraction from said first evaporating zone to a second evaporating zone operated at 3 to 5 p. s. i. g. and 300 to 320° F.; recovering $SO_2$ as an overhead from said second evaporating zone; introducing the bottom fraction from said second evaporating zone to a third evaporating zone operated at 50 to 75 mm. Hg and 340 to 360° F.; recovering $SO_2$ as an overhead from said third evaporating zone; recovering an aromatic fraction from the lower portion of said third evaporating zone, said fraction containing not over 200 p. p. m. of $SO_2$; cooling said aromatic fraction to a temperature of 140 to 160° F. and treating said cooled stream with 0.025 to 0.15 pound of anhydrous ammonia per barrel of said extract.

5. A process of producing carbon black, comprising extracting a hydrocarbon feed having a boiling range of 350 to 950° F. with a selective solvent consisting of $SO_2$; recovering an extract from said extraction step; cooling said extract to a temperature of about 150° F.; treating said cooled extract with 0.068 to 0.075 pound of anhydrous ammonia per barrel of said extract; and burning at least a portion of said extract.

6. The process of producing carbon black, comprising extracting a hydrocarbon feed having a boiling range of 350 to 950° F. with a selective solvent consisting of $SO_2$; recovering an extract from said extraction step; cooling said extract to a temperature of 140 to 160° F.; treating said cooled extract with 0.025 to 0.15 pound of anhydrous ammonia per barrel of said extract; and burning at least a portion of said extract.

7. A process of producing carbon black, comprising contacting a hydrocarbon fraction boiling between 350 and 950° F. with $SO_2$ at a pressure of 20 to 90 p. s. i. g. and a temperature of 20 to 90° F., removing an aromatic-$SO_2$ fraction into a first evaporating zone comprising an upper portion operating at 115 to 130 p. s. i. g. and 130 to 150° F. and a lower portion operating at 90 to 110 p. s. i. g. and 290 to 310° F., recovering $SO_2$ as an overhead from said first evaporating zone; introducing the bottom fraction from said first evaporating zone to a second evaporating zone operated at 3 to 5 p. s. i. g. and 300 to 320° F., recovering $SO_2$ as an overhead from said second evaporating zone, introducing the bottom fraction from said second evaporating zone to a third evaporating zone operated at 50 to 75 mm. Hg and 340 to 360° F.; recovering $SO_2$ as an overhead from said third evaporating zone; recovering an aromatic fraction from the lower portion of said third evaporating zone, said fraction containing not over 200 p. p. m. of $SO_2$; cooling said aromatic fraction to a temperature of about 150° F.; treating said cooled stream with 0.068 to 0.075 pound of anhydrous ammonia per barrel of said extract; and burning at least a portion of said extract.

8. A process of producing carbon black comprising contacting a hydrocarbon fraction boiling between 350 and 950° F. with $SO_2$ at a pressure of 20 to 90 p. s. i. g. and a temperature of 20 to 90° F., removing an aromatic-$SO_2$ fraction; introducing said aromatic-$SO_2$ fraction into a first evaporating zone comprising an upper portion operating at 115 to 130 p. s. i. g. and 130 to 150° F. and a lower portion operating at 90 to 110 p. s. i. g. and 290 to 310° F.; recovering $SO_2$ as an overhead from said first evaporating zone; introducing the bottom fraction from said first evaporating zone to a second evaporating zone operated at 3 to 5 p. s. i. g. and 300 to 320° F.; recovering $SO_2$ as an overhead from said second evaporating zone; introducing the bottom fraction from said second evaporating zone to a third evaporating zone operated at 50 to 75 mm. Hg and 340 to 360° F.; recovering $SO_2$ as an overhead from said third evaporating zone; recovering an aromatic fraction from the lower portion of said third evaporating zone, said fraction containing not over 200 p. p. m. of $SO_2$; cooling said aromatic fraction to a temperature of 140 to 160° F.; treating said cooled stream with 0.025 to 0.15 pound of anhydrous ammonia per barrel of said extract; and burning at least a portion of said extract.

9. A process of preparing an aromatic feed stock for the production of carbon black, comprising extracting a hydrocarbon feed having a boiling range of 350 to 950° F. with a selective solvent consisting of $SO_2$; recovering an extract from said extraction step; cooling said extract to a temperature of at least as low as 160° F.; and treating said cooled extract with 0.025 to 0.15 pound of anhydrous ammonia per barrel of said extract.

10. A process for preparing an aromatic feed stock for the production of carbon black, comprising contacting a hyrocarbon fraction boiling between 350 and 950° F. with $SO_2$ at a pressure of 20 to 90 p. s. i. g. and a temperature of 20 to 90° F., removing an aromatic-$SO_2$ fraction; introducing said aromatic-$SO_2$ fraction into a first evaporating zone comprising an upper portion operating at 115 to 130 p. s. i. g. and 130 to 150° F. and a lower portion operating at 90 to 110 p. s. i. g. and 290 to 310° F.; recovering $SO_2$ as an overhead from said first evaporating zone; introducing the bottom fraction from said first evaporating zone to a second evaporating zone operated at 3 to 5 p. s. i. g. and 300 to 320° F.; recovering $SO_2$ as an overhead from said second evaporating zone; introducing the bottom fraction from said second evaporating zone to a third evaporating zone operated at 50 to 75 mm. Hg and 340 to 360° F.; recovering $SO_2$ as an overhead from said third evaporating zone; recovering an aromatic fraction from the lower portion of said third evaporating zone, said fraction containing not over 200 p. p. m. of $SO_2$; cooling said aromatic fraction to a temperature of at least as low as 160° F. and treating said cooled stream with 0.025 to 0.15 pound of anhydrous ammonia per barrel of said extract.

11. The process of producing carbon black, comprising extracting a hydrocarbon feed having a boiling range of 350 to 950° F. with a selective solvent consisting of $SO_2$; recovering an extract from said extraction step; cooling said extract to a temperature of at least as low as 160° F.; treating said cooled extract with 0.025 to 0.15 pound of anhydrous ammonia per barrel of said extract; and burning at least a portion of said extract.

12. A process of producing carbon black comprising contacting a hydrocarbon fraction boiling between 350 and 950° F. with $SO_2$ at a pressure of 20 to 90 p. s. i. g. and a temperature of 20 to 90° F., removing an aromatic-$SO_2$ fraction; introducing said aromatic-$SO_2$ fraction into a first evaporating zone comprising an upper portion operating at 115 to 130 p. s. i. g. and 130 to 150° F. and a lower portion operating at 90 to 110 p. s. i. g. and 290 to 310° F.; recovering $SO_2$ as an overhead from said first evaporating zone; introducing the bottom fraction from said first evaporating zone to a second evaporating zone operated at 3 to 5 p. s. i. g. and 300 to 320° F.; recovering $SO_2$ as an overhead from said second evaporating zone; introducing the bottom fraction from said second evaporating zone to a third evaporating zone operated at 50 to 75 mm. Hg and 340 to 360° F.; recovering $SO_2$ as an overhead from said third evaporating zone; recovering an aromatic fraction from the lower portion of said third evaporating zone, said fraction containing not over 200 p. p. m. of $SO_2$; cooling said aromatic fraction to a temperature of at least as low as 160° F.; treating said cooled stream with 0.025 to 0.15 pound of anhydrous ammonia per barrel of said extract; and burning at least a portion of said extract.

References Cited in the file of this patent

UNITED STATES PATENTS

| | | |
|---|---|---|
| 1,423,710 | Clancy | July 25, 1922 |
| 1,871,694 | Ihrig | Aug. 16, 1932 |
| 1,893,733 | Deanesly | Jan. 10, 1933 |
| 1,917,736 | Saegebarth | July 11, 1933 |
| 2,302,303 | Duncan | Nov. 17, 1942 |
| 2,558,838 | Goodson | July 3, 1951 |
| 2,651,594 | Blatz | Sept. 8, 1953 |

FOREIGN PATENTS

| | | |
|---|---|---|
| 435,965 | Great Britain | Nov. 10, 1934 |